J. E. PEARCE.
PLOW.
APPLICATION FILED JULY 3, 1912.
1,111,613.
Patented Sept. 22, 1914.
2 SHEETS—SHEET 2.
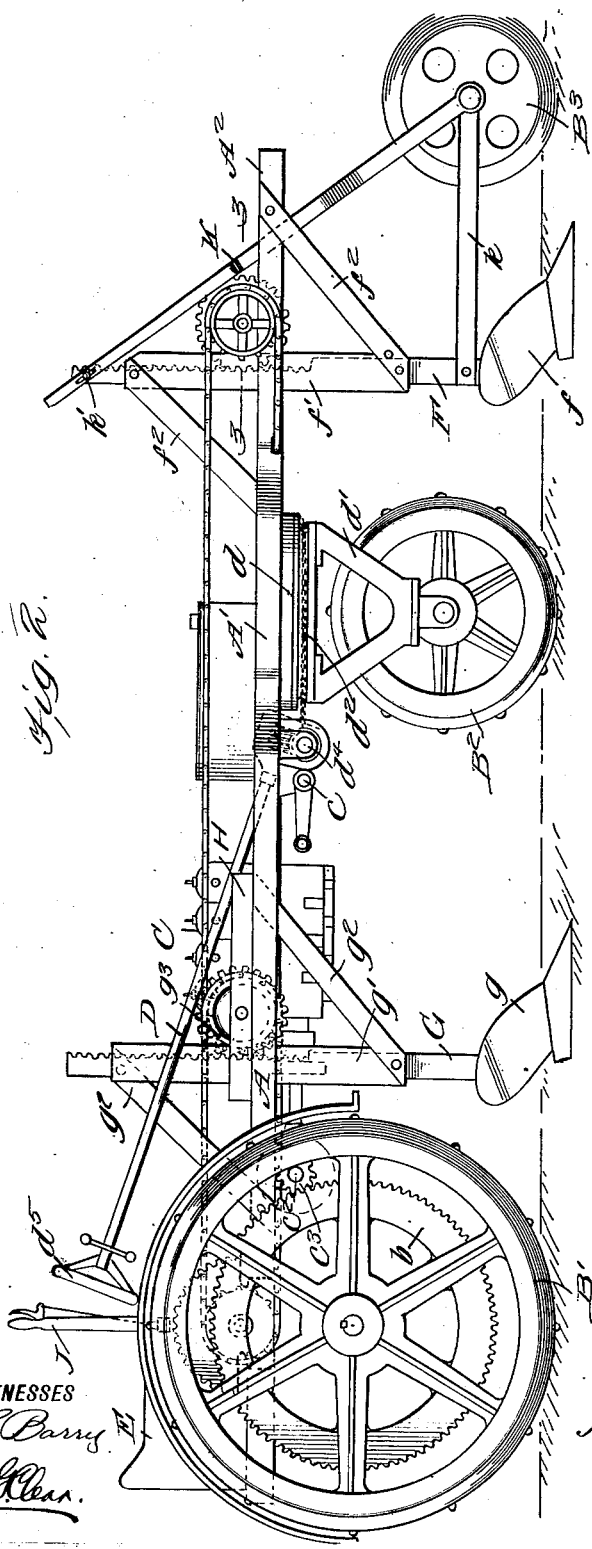
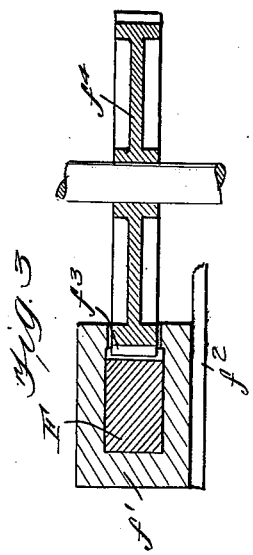
WITNESSES
H. C. Barry
Myron G. Clear
INVENTOR
James E. Pearce
BY Munn & Co.
ATTORNEYS

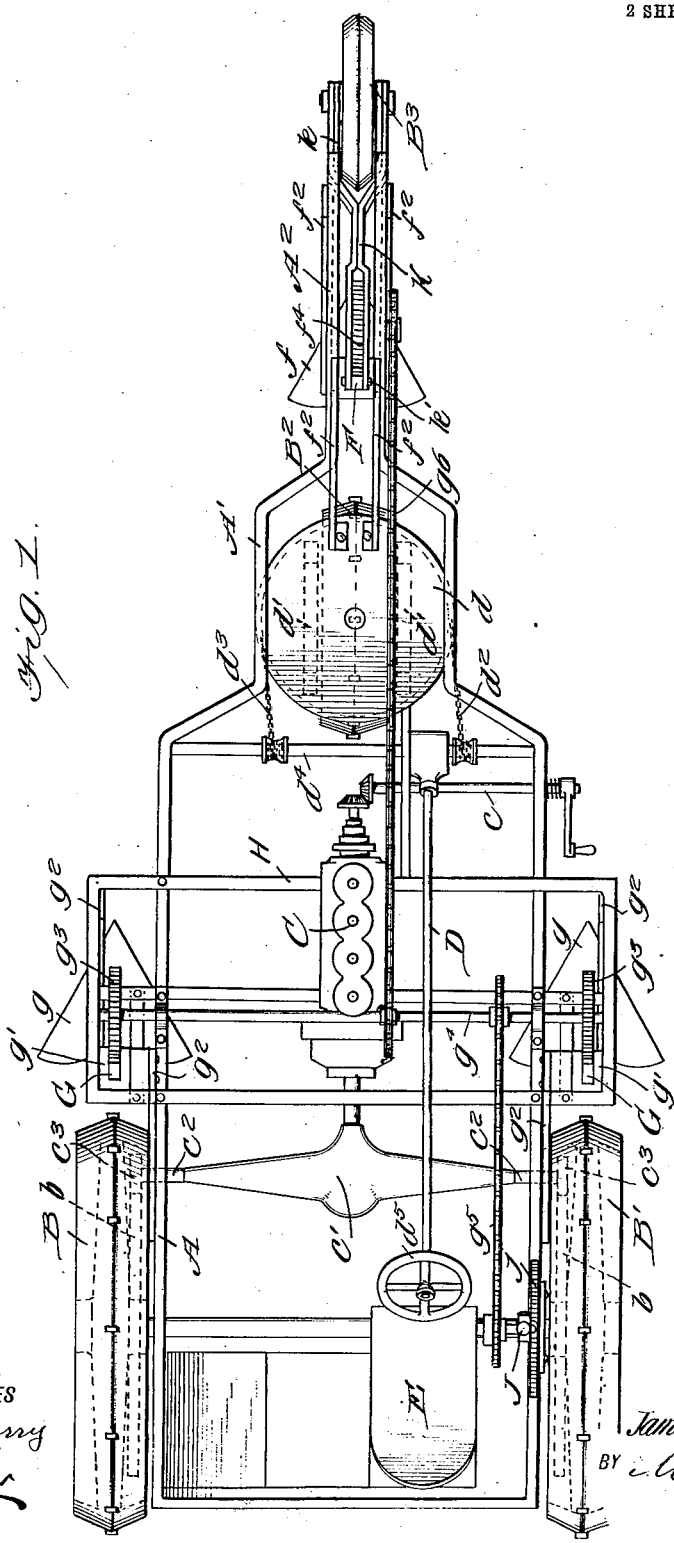

UNITED STATES PATENT OFFICE.

JAMES EDWIN PEARCE, OF AUSTIN, TEXAS.

PLOW.

1,111,613.  Specification of Letters Patent.  Patented Sept. 22, 1914.

Application filed July 3, 1912. Serial No. 707,489.

*To all whom it may concern:*

Be it known that I, JAMES E. PEARCE, a citizen of the United States, and a resident of Austin, in the county of Travis and State of Texas, have invented a new and useful Improvement in Plows, of which the following is a specification.

My present invention relates to plows for bedding and ridging plowed ground, my object being to provide a construction in which a motor drive is especially adapted, without the necessity of means to pack loose earth in order to obtain the required resistance to the weight and power of the supporting driven wheels.

To this end, the machine is mounted upon three wheels, one dirigible front wheel and two larger tractor rear wheels, all preceded by large double turning plows or "middle busters" which throw the loose plowed earth into beds or ridges and leave exposed furrows, at the bottom of which is firm earth, and in which the three supporting wheels of the machine roll. This arrangement, which is particularly adapted to preparing for cotton or corn, is such that the work is accomplished with a minimum expenditure of power and at a great saving as compared with machines whose wheels either precede the ridging plows or are arranged in loose plowed earth.

In addition to the foregoing, it will be shown that the wheels, in their particular arrangement, perform a rear function aside from supporting and driving the machine.

In the accompanying drawings:—Figure 1 is a top plan view of my improved machine; Fig. 2 is a side elevation thereof; and Fig. 3 is a detail horizontal section through the forward plow-beam, its support and adjusting wheel taken substantially on the line 3—3 of Fig. 2.

Referring generally to the structure of the machine, it may be said to comprise a stepped frame including a rear portion A, generally rectangular in form, an intermediate portion A' of reduced width in comparison to the portion A, and a forward portion $A^2$ which is in turn reduced in width as compared to the intermediate portion A'. The rear frame portion A supports the large side wheels B, B', and the intermediate frame portion A' supports the single front wheel $B^2$, while the forward frame portion $A^2$ supports the forward land roller $B^3$, the function of which will be hereinafter made plain.

The driving arrangement includes a motor C arranged longitudinally of the machine and within the rear frame portion A, having the forward portion of its power-shaft connected with a cranking shaft $c$ and having the rear portion of its power-shaft extending to the differential $c'$ from which the portions $c^2$ of the transmission shaft extend laterally and are provided with gear wheels $c^3$ having connection with gear wheels $b$ secured to the rear side supporting wheels B and B'.

The forward wheel $B^2$ is carried by a fork $d'$ at the upper end of which is a turntable $d^2$ seated upwardly against the rigid annulus $d$ secured beneath the intermediate frame portion A', the said turntable being manipulated by a partially encircling and flexible steering connection, the ends $d^3$ of which are coiled in opposite directions, and at different points, upon a transverse shaft $d^4$ having a worm connection with the lower end of the steering post D, the latter being inclined upwardly and rearwardly, and having its operating wheel $d^5$ at a point immediately in front of the operator's seat E. Thus the movement of the machine may be effectively guided.

Of the trio of plows, one of which precedes each of the wheels B, B' and $B^2$, the forward plow consists of a share $f$ secured to the lower end of a beam F, the upper portion of which has a rack and is vertically adjustable within its boxing $f'$ secured between the side bars of the forward frame portion $A^2$ and suitably braced at its upper and lower ends by members $f^2$. The upper portion of the boxing $f'$ is provided with a slot $f^3$ through which its adjusting gear $f^4$ may extend into mesh with the rack of the plow-beam F. The rear plows preceding the wheels B and B', embody lower shares $g$ secured to the ends of beams G which have upper rack portions and are vertically adjustably disposed in boxings $g'$ which are secured within the end portions of a supplemental frame H mounted laterally of the main frame portion A at a point immediately in front of the said wheels. The upper and lower portions of the boxings $g'$ are braced by members $g^2$, the boxings being further provided with slots through which gear wheels $g^3$ project into mesh with the rack portions of the plow-beams. The gear wheels $g^3$ are secured upon the same shaft $g^4$ mounted in the before-mentioned supplemental frame, and upon the shaft $g^4$ is also held a pair of sprocket wheels, one of which is connected by a chain $g^5$ with a sprocket wheel secured upon a shaft mounted in the main frame immediately adjacent the driver's seat E, the rotation of which shaft is under control of a hand-lever J, and the other sprocket wheel of which is connected by a chain $g^6$ to a sprocket wheel mounted upon the shaft with the front plow-beam adjusting gear $f^4$. Thus the operator may move the hand-lever J for the purpose of raising and lowering the trio of plows in unison, the said hand-lever being provided with a latch mechanism engageable with a fixed quadrant $j$ for the purpose of locking the plows in selected position.

The forward roller $B^3$ has its axle pivotally connected to the lower portion of the forward plow-beam F by means of side bars $k$ and further connected by upwardly inclined bars K with the upper end of the plow-beam F above its boxing $f'$, this latter connection including slots in the bars K through which an adjusting bolt $k'$ extends through said beam and forms an adjustable connection whereby to permit the vertical adjustment of the roller $B^3$ with respect to the plowshare $f$. It will be noted, however, that when the roller $B^3$ has been once adjusted, it will thereafter move up and down with the plow-beam F when the latter is adjusted vertically by manipulation of the operating lever J, as previously described.

While it is evident that the means for driving and steering the machine and effecting the vertical adjustment of the plows, may be readily understood from the foregoing, attention is again called to the fact that each of the plows is arranged to precede one of the main wheels, and attention is further called to the fact that being double turning plows or "middle busters" the shares are V-shaped and that the peripheral faces of the wheels B, B' and $B^2$ are of similar shape. It will thus be seen that during the operation of the machine, the wheels B, B' and $B^2$ will follow along in furrows formed by the plowshares and effect the packing of the earth along the base of the furrows, resulting in the formation of a stratum of earth along each furrow base which is impervious to water and is capable of conserving rain-water near the surface of the soil after the manner known as "dry farming." It is to be understood, however, that the three furrows thus made are only about twenty-seven inches apart and that the land is to be gone over immediately a second time to complete the plowing, the plows this time splitting the ridges made in the first plowing, and thus as the bases of all of the furrows will be packed as before described, the earth below the loose soil will be almost completely packed. In this operation, it is intended that the furrows shall be formed to a depth equal to that to which the ground has been previously plowed, and in this manner the ground even before packing, as just described, affords to the driving wheels B and B' a generally solid surface, and in this manner effects great economy in power.

Should the forward wheel $B^2$ strike a point in the furrow which is unusually soft, it would permit the weight of the frame and its parts to drive the forward plowshare $f$ into the raw unplowed subsoil, were it not for the roller $B^3$ which, if properly adjusted with respect to the plowshare, will effectively prevent the same from lowering inasmuch as this roller travels forwardly of the first plowshare and consequently upon the surface of unplowed ground which the first plowshare has not yet reached. Thus the roller $B^3$ resists any tendency of the front of the machine to lower and prevents the forward plow from being inclined so as to turn its point more deeply into the soil than is either necessary or desired. Of course should one of the rear frame wheels or the rear of the frame itself lower, which is unlikely as the rear frame wheels run on the bases of the furrows and consequently the solid ground, the points of the rear plows would not be turned down and their bases would therefore resist any such lowering movement.

I claim:—

1. The combination of a frame, a plurality of plow beams depending from the frame, shares carried by said beams, wheels supporting the frame, each of said wheels being mounted in the rear of, and in line with, one of the said plows and being adapted to travel on and pack the base of the furrow made by its respective plow, and a roller mounted forwardly of the foremost plow beam and share.

2. The combination of a frame, a plurality of plow beams depending from the frame, shares carried by the said beams, wheels supporting the frame, each of said wheels being mounted in the rear of and in line with, one of said plow shares, and a roller mounted forwardly of the foremost plow beam and having a vertical adjustable connection therewith.

3. The combination of a frame, a plurality of plow beams vertically adjustable in the frame, shares carried by the said beams, supporting wheels for the frame mounted in the rear of, and in line with said plow shares, and a roller mounted forwardly of the foremost plow beam, said roller being connected to the said foremost plow beam for vertical movement therewith and vertical adjustment with respect thereto.

JAMES EDWIN PEARCE.

Witnesses:
Geo. W. Walling, Jr.,
H. A. Turner.